(12) United States Patent
Lechner et al.

(10) Patent No.: US 7,543,424 B2
(45) Date of Patent: Jun. 9, 2009

(54) BEVERAGE BOTTLING PLANT FOR FILLING AND CLOSING BEVERAGE BOTTLES WITH A PACKAGING DEVICE FOR PACKAGING BEVERAGE BOTTLES

(75) Inventors: Tilo Lechner, Emmerich (DE); Ludger Pauls, Ven-Zelderheide (NL)

(73) Assignee: KHS Maschinen-und Anlagenbau AG, Dortmund (DE)

( * ) Notice: Subject to any disclaimer, the term of this patent is extended or adjusted under 35 U.S.C. 154(b) by 18 days.

(21) Appl. No.: 11/449,387

(22) Filed: Jun. 8, 2006

(65) Prior Publication Data

US 2007/0000570 A1    Jan. 4, 2007

(30) Foreign Application Priority Data

Jun. 9, 2005    (DE) .................. 10 2005 026 639

(51) Int. Cl.
 *B65B 3/00* (2006.01)
 *B65G 23/00* (2006.01)
(52) U.S. Cl. .................... 53/281; 53/538; 198/792
(58) Field of Classification Search ............ 53/253, 53/331.5, 317, 319, 534, 538; 198/459.8, 198/792
See application file for complete search history.

(56) References Cited

U.S. PATENT DOCUMENTS

| | | | | |
|---|---|---|---|---|
| 3,447,666 A | * | 6/1969 | Nevo-Hacohen ............ 198/792 |
| 3,462,002 A | * | 8/1969 | Zuppiger ..................... 198/792 |
| 3,565,012 A | * | 2/1971 | Nearman .................. 104/172.4 |
| 3,565,238 A | * | 2/1971 | Candela ...................... 198/792 |
| 3,894,629 A | * | 7/1975 | Wakabayashi ............... 198/718 |
| 4,197,933 A | * | 4/1980 | Dunstan et al. .............. 198/792 |
| 4,227,606 A | * | 10/1980 | Bogatzki ................. 198/459.8 |
| 4,576,562 A | * | 3/1986 | Anderson ................... 198/792 |
| 4,660,350 A | | 4/1987 | Hogenkamp et al. |
| 5,692,594 A | * | 12/1997 | Sidler ...................... 198/459.8 |
| 5,713,403 A | * | 2/1998 | Clusserath et al. .......... 141/101 |
| 5,878,865 A | * | 3/1999 | Bailey et al. ............. 198/459.8 |
| 2001/0019006 A1 | | 9/2001 | Stauber |

FOREIGN PATENT DOCUMENTS

| | | |
|---|---|---|
| DE | 21 10 819 A1 | 9/1972 |
| DE | PS 30 29 508 | 3/1982 |
| DE | PS 34 14 607 | 10/1985 |
| DE | 694 18 497 T2 | 9/1999 |
| DE | 298 16 128 U1 | 11/1999 |
| DE | 103 47 540 A1 | 5/2005 |
| EP | 0 608 102 A | 7/1994 |
| EP | 1 067 048 A | 1/2001 |
| EP | 1 232 969 A1 | 8/2002 |

* cited by examiner

*Primary Examiner*—Louis K Huynh
(74) *Attorney, Agent, or Firm*—Nils H. Ljungman & Associates

(57) ABSTRACT

A beverage bottling plant for filling and closing beverage bottles with a packaging device for packaging beverage bottles. The packaging device comprises a beverage bottle handling machine for maintaining separation and spacing of groups of bottles and for compacting bottles into groups having desired outer perimeter shape and outer perimeter size and dimensions.

20 Claims, 7 Drawing Sheets

BEVERAGE BOTTLING PLANT FOR FILLING AND CLOSING BEVERAGE BOTTLES WITH A PACKAGING DEVICE FOR PACKAGING BEVERAGE BOTTLES

BACKGROUND

1. Technical Field

This application relates to a device for the separation into lots, spacing and grouping of packaged goods, boxes, workpieces or items such as bottles, cans and similar containers with a conveyor, on which a stream of items is guided and with separating elements that interact with said conveyor and can be moved so that they are engaged at a predetermined spot on the conveyor behind or between the packaged goods and separate said packaged goods into individual units, rows or groups, whereby the distances between the separating elements are variable, and different group sizes can be created and the separator elements or separator fingers are held on conveyors or conveyor chains that preferably circulate independently of the item conveyor.

2. Background Information

In the field of industrial manufacturing there are numerous situations in which products that have been assembled into units for production or consumption or bottled products must be combined into larger units for transport, distribution or sale. In the beverage industry in particular, a large number of bottles, cans and similar containers must be packed into cases, boxes, trays or shrink-wrap. For the performance of these packing tasks, most of which are performed by case packers, packing or palleting machines, it is necessary to separate a stream of products that are preferably delivered to the packing machine continuously into groups or formations of defined sizes, as a function of their subsequent position in a package or on a pallet. In this context, it is necessary to position the items at the proper spacing and to achieve an appropriate synchronization of the formatted or individual packaged goods in relation to the specified machine cycle. The prior art describes a number of different devices that perform this task.

For example, DE-PS 30 29 508 describes a device for the grouping of large numbers of bottles for packing in cases or boxes and similar containers. To make it possible to process different items and package sizes, between the packing machine and the delivery conveyor belt there is a grouping device that has a plurality of rods that are mounted so that they can move radially with respect to a drive shaft, and on the ends of the rods there are separator fingers which extend into the moving stream of articles and separate it into appropriate groups of items. The separator fingers are also controlled by a circulation guide. For the creation of different package sizes, both the drive shaft and the circulation guide can be adjusted and moved, so that the point at which the separator fingers are inserted into the flow of items and the point at which they emerge from the separated group of articles are defined synchronously by the simultaneous adjustment of the drive shaft and of the circulation guide. To make the adjustment, the drive shaft is adjusted so that it is perpendicular with respect to the conveyor belt and the circulation guide is simultaneously spread or placed over it like a mushroom. One disadvantage of this device of the prior art is that the separator fingers, during the separation of the groups of articles from the flow of items, is subjected to sudden and significant changes in velocity and acceleration, as a result of which the articles are not automatically able to track the movement of the separator fingers and consequently execute uncontrolled movements or bump against each other and can even fall or be knocked over.

In the context of this application, the term "separator finger" which is used throughout the application means all the elements that are inserted into a product stream to separate it into lots, group or batches, to break up the flow or to position the individual products. The separator fingers can be elements that are pin-shaped, rod-shaped or any other shape, and can be inserted into the product flow from above, below and/or from a lateral direction.

DE-PS 34 14 607 also describes a corresponding device of the prior art that works according to a comparable principle. As a result of the additional presence of drag levers in combination with an external rotating wheel and a non-adjustable circulation guide, it is possible to operate the separator fingers at a more uniform velocity. However, this device is very complex and expensive in terms of its construction, as a result of the large number of additional components.

Another device for the grouping and spacing of items is described in DE 298 16 128 U1. The means of transport for the separator fingers is a flat link articulated chain, the length of which is variable.

In contrast to the conventional construction of flat link articulated chains, in which the connecting pins to the respective neighboring links of the chain are mounted in borings, the links of the flat link articulated chain taught by this prior art document have slots on one side. The distance between the connecting pins of a chain link can be reduced by means of these slots, which also results in a reduction of the overall length of the chain.

To make a change in the length of the flat link articulated chain, the chain links have control lugs that project laterally outward and are engaged in the threads of a feed screw or worm conveyor that determines the pitch only or independently. This feed screw can be driven in synchronization with the conveyor chain, and over its effective length defines the speed of transport of the drivers and also the distance between them, as well as their spacing. In this context, it should be noted that the shortening of the flat link articulated chain can be effective only in the vicinity of the feed screw.

One disadvantage of this device of the prior art is the unstable behavior of the individual links and their slots with respect to one another, and the resulting noise that is generated continuously, as well as the inevitably increased wear on the components used. These disadvantages cannot be overcome even by special coating measures to reduce the amount of noise that is generated by components that come into contact with one another during operation. A further disadvantage is the rigid definition of the distance between the individual groupings as a result of the fixed pitch of the conveyor groove or of the thread of the conveyor screw, as a result of which any change in the distance between groupings requires a replacement of the conveyor screw, which is a complex, time-consuming and expensive operation.

OBJECT OR OBJECTS

The object of at least one possible embodiment, starting from the prior art described above and the various problems thereof, is to eliminate the above-mentioned disadvantages and to create a simplified device for the handling of objects as they are separated into lots or batches, spaced, grouped etc., whereby a high peripheral velocity is to be guaranteed, and whereby fast and easy conversion to handle different sizes and formats is guaranteed, even with a large variety of products.

SUMMARY

This object can be achieved by at least one possible embodiment of a device for the separation, spacing and grouping of packaged goods, wherein a conveyor chain is guided with a first flat link bearing in a first plane and is guided with a corresponding additional flat link bearing in a second plane, and the first and second planes can be moved to a uniform and variable spacing with respect to one another. Also, in at least one other possible embodiment, the conveyor chain has a first flat link or link bearing with sliding means that are guided on guide tracks and a corresponding additional flat link bearing holds the respective separator finger, and can be moved with its sliding means along a second guide track, and at least the second guide track is mounted so that it can be moved in terms of height or vertically relative to the first guide track to change the distance between the separator fingers.

With a device according to at least one of the possible embodiments disclosed herein, a significantly improved and simplified conversion and adaptation to different formatting and synchronization tasks can be essentially guaranteed, with significantly improved running characteristics of such a device.

Additional features and characteristics of at least one possible embodiment are described in greater detail below on the basis of the preferred exemplary embodiments that are illustrated in the accompanying drawings. The features described and/or illustrated thereby form at least one object of at least one possible embodiment, individually or in any suitable combination.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1A:
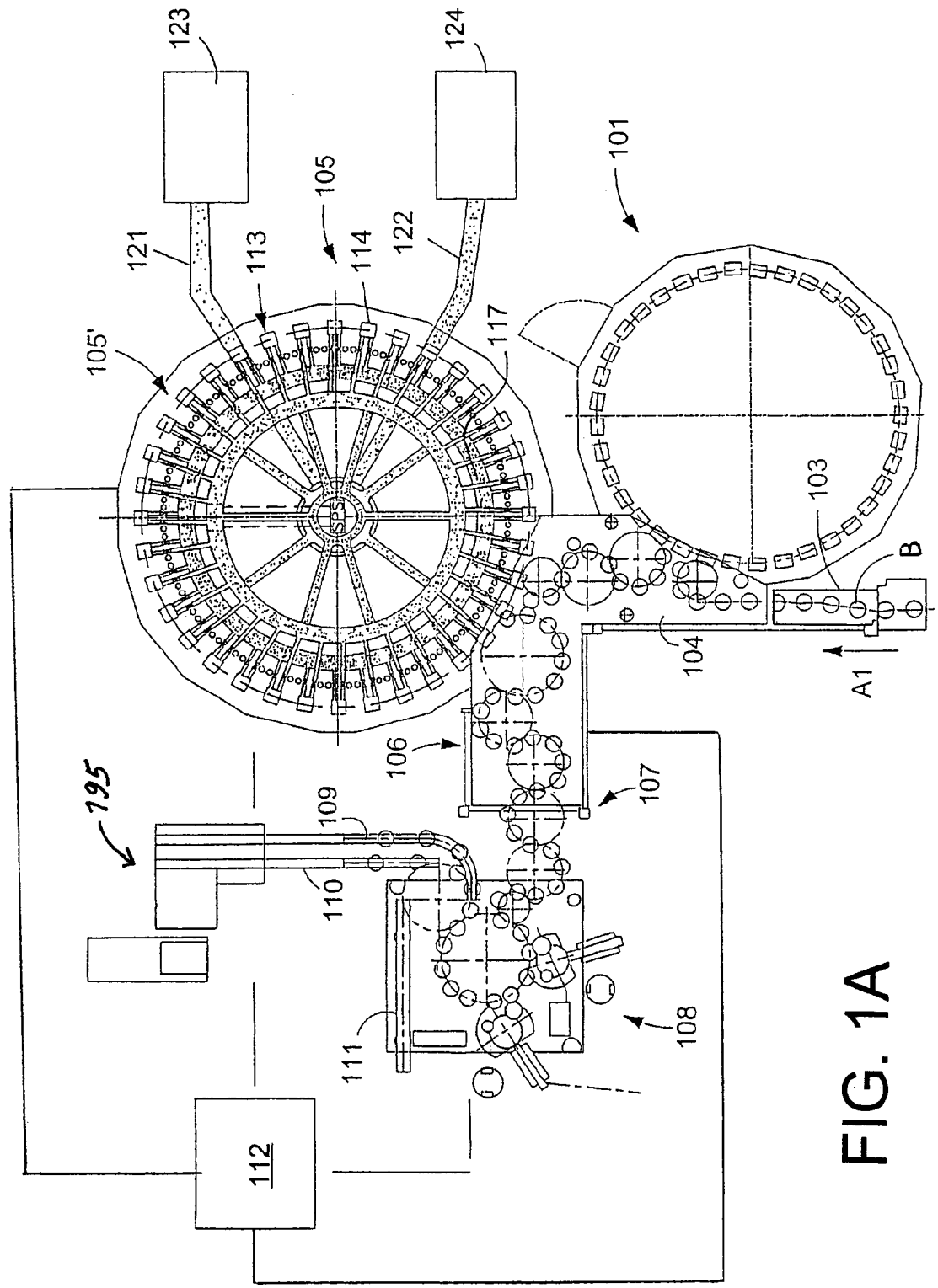
FIG. 1A shows schematically the main components of one possible embodiment example of a system for filling containers.

FIG. 1A shows schematically the main components of one possible embodiment example of a system for filling containers, specifically, a beverage bottling plant for filling bottles B with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles B, are fed in the direction of travel as indicated by the arrow A1, by a first conveyer arrangement 103, which can be a linear conveyor or a combination of a linear conveyor and a starwheel. Downstream of the rinsing arrangement or rinsing station 101, in the direction of travel as indicated by the arrow A1, the rinsed bottles B are transported to a beverage filling machine 105 by a second conveyer arrangement 104 that is formed, for example, by one or more starwheels that introduce bottles B into the beverage filling machine 105.

The beverage filling machine 105 shown is of a revolving or rotary design, with a rotor 105', which revolves around a central, vertical machine axis. The rotor 105' is designed to receive and hold the bottles B for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles B to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle B, the first product or the second product can be filled by means of an appropriate control of the filling product or fluid valves.

Downstream of the beverage filling machine 105, in the direction of travel of the bottles B, there can be a beverage bottle closing arrangement or closing station 106 which closes or caps the bottles B. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles B. In the embodiment shown, the labeling arrangement 108 has three output conveyer arrangement: a first output conveyer arrangement 109, a second output conveyer arrangement 110, and a third output conveyer arrangement 111, all of which convey filled, closed, and labeled bottles B to different locations.

The first output conveyer arrangement 109, in the embodiment shown, is designed to convey bottles B that are filled with a first type of liquid beverage supplied by, for example, the supply reservoir 123. The second output conveyer arrangement 110, in the embodiment shown, is designed to convey bottles B that are filled with a second type of liquid beverage supplied by, for example, the supply reservoir 124. Both of these output conveyor arrangements convey the bottles B to a beverage bottle packaging arrangement 195, which packs the beverage bottles into packages and then organizes the packages for placement on pallets or other similar structures for shipping. The third output conveyer arrangement 111, in the embodiment shown, is designed to convey incorrectly labeled bottles B. To further explain, the labeling arrangement 108 can comprise at least one beverage bottle inspection or monitoring device that inspects or monitors the location of labels on the bottles B to determine if the labels have been correctly placed or aligned on the bottles B. The third output conveyer arrangement 111 removes any bottles B which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Figure 1:
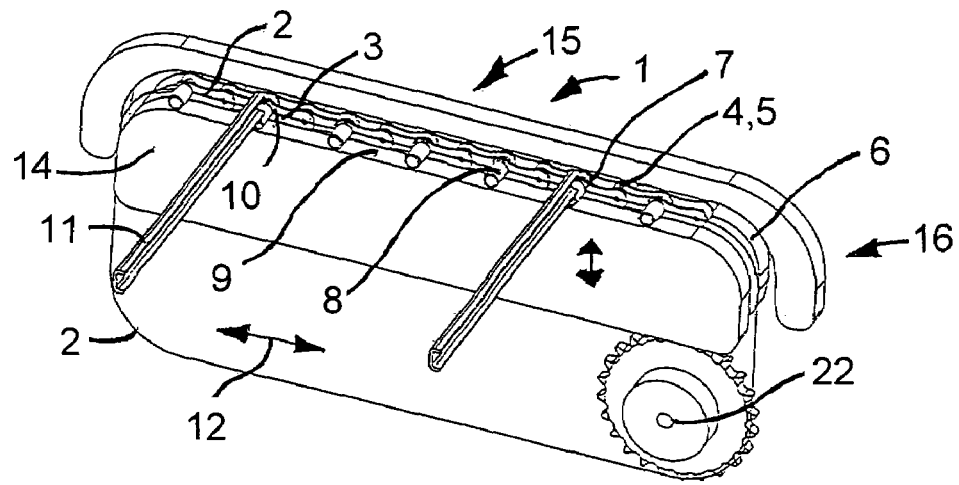
FIG. 1 shows a device with separator fingers guided with the maximum distance between them.

In the exemplary embodiment illustrated in FIG. 1, the device for the separation into lots, spacing and grouping of packaged goods—called a separating device below—comprises a conveyor which is not illustrated in any further detail in the figure, e.g. of the type described in DE 103 47 540 A1, and the text of which, to the extent that it contributes to supplementing and explaining the invention and this description, is hereby incorporated by reference.

The actual separating device 1 is located on at least one side of a conveyor of this type. The separating device has a conveyor chain 2 in the form of a flat link chain with flat links 3.

The flat links 3 that are part of a chain link are connected on their ends, in a manner which is itself described in the prior art, by means of an articulated connection with the neighboring chain links. Also in the manner described in the prior art, the articulated connections likewise form the active or engagement surfaces for the sprocket wheels that drive the conveyor chain 2, for which purpose the articulated connections are equipped with connecting pins or similar mechanisms.

At least one possible embodiment teaches that at least some of these articulated connections are equipped with bearing elements, which are designated flat link bearings 4, 7. According to at least one possible embodiment, for example, these flat link bearings 4, 7—viewed in the direction of conveyance of the conveyor chain 2—are located on both sides, whereby each articulated connection is equipped with a flat link bearing 4 on a maximum of one side.

For example, a first flat link bearing 4 has a slide pin or a caster 5, which slide along a first guide track 6. Corresponding to this flat link bearing 4 is an additional flat link bearing 7 which is guided with an additional slide pin 8 along a second guide track 9.

Figure 2:
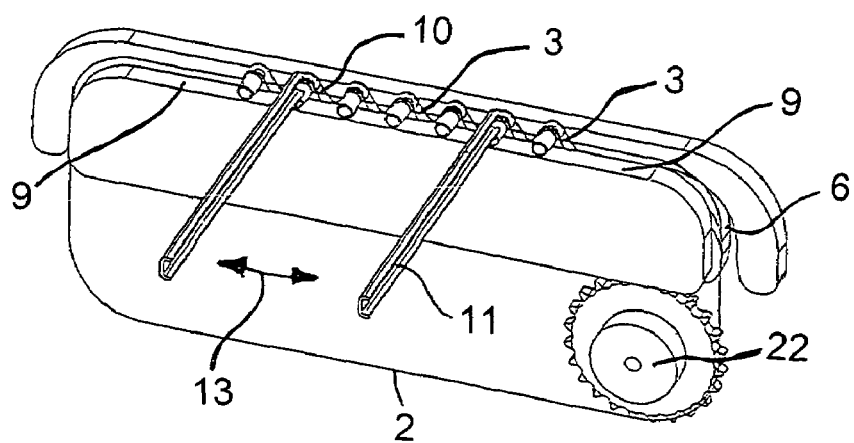
FIG. 2 shows the separator fingers at a closer distance to one another.

Depending on the length of such a link 3, on each link 3 or after a plurality of intermediate links, the actual separator finger 11 can be located on a subsequent link 10. These separator fingers are preferably oriented equi-axially with a slide pin 8. At least one guide track 6 or 9 is mounted so that it can move relative to the other one, preferably in terms of height or vertically, to vary the distance between the separator fingers 11. When the height of at least the second guide track 9 is adjusted, the linear extension of the conveyor chain 2 visible in FIG. 1 changes to an approximately acute-angle extension of the links 3 as shown in FIG. 2. Obviously, the adjustment of the height of the second guide track 9 can be varied to produce virtually any desired spacing between adjacent separator fingers 11.

The wide spacing 12 of the separator fingers 11 that results from a linear extension changes correspondingly into a narrower spacing 13, as shown in FIG. 2. The guide tracks 6 and/or 9 are advantageously continuously adjustable. According to at least one possible embodiment, for example, the first guide track 6 is stationary and the second guide track 9 is vertically adjustable and is mounted so that it points toward the conveyor belt or so that it can be moved in relation to the conveyor belt. To provide stabilizing support for the chain, at least the first guide track 6 is realized in the form of a groove cam track. However, both guide tracks 6, 9 can also form at least partly closed groove cam tracks.

Figure 2A:
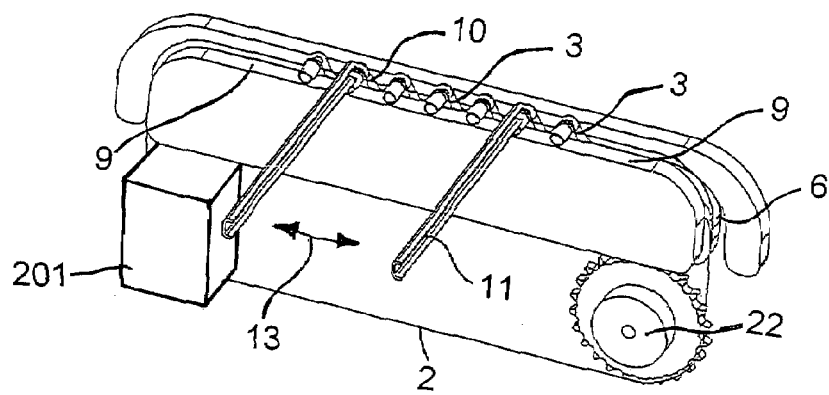
FIG. 2A shows one possible embodiment of the package separating and compacting device with a chain take-up or adjustment arrangement.

At least one adjustable guide track 6 or 9 is also mounted so that its entrance area 14 and/or its total area 15 can be tilted, which makes possible a particularly advantageous precision adjustment. A corresponding tilt can also be provided for the outlet-side area 16. The separator fingers 11 are appropriately mounted so that they can be adjusted to different and optimal contact positions against the packaged goods 17 by a combined adjustment of the guide tracks 6, 9, which are mounted so that their vertical position on the conveyor can be varied, whereby the distances between the separator fingers 11 and/or their contact positions in relation to the packaged goods 17 that are being processed can be adjusted automatically. This adjustment can be achieved, for example, by entering the desired formation into the associated packing machine directly via its automatic control system. The change in the length of the chain that results from the different spacings 12, 13 and the related change in angle are compensated by corresponding chain take-ups or chain adjusters 201, as represented by a box in FIG. 2A. The chain take-up or adjuster 201 can be of any known configuration suitable for compensating for changes in the length of a chain or the related change in angle.

Figure 2B:
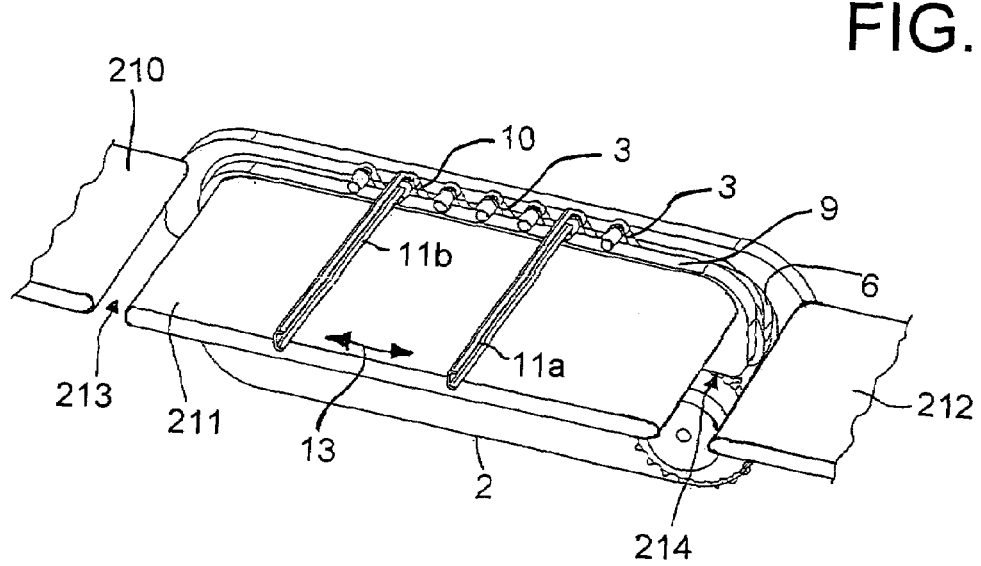
FIG. 2B shows one possible embodiment of the package separating and compacting device with related conveyor belts or similar devices for transporting packages.

FIG. 2B shows one possible embodiment of the package separating and compacting device with related conveyor belts or similar devices for transporting packages. In the embodiment shown, a first conveyor belt structure 210, which is shown in part, transports packages to a second conveyor belt structure 211, which transports packages to a third conveyor belt structure 212, which is also shown only in part. It should at this time be noted that in one possible embodiment, the conveyor belt structures could be spaced such that adjacent conveyor belt structures could be closer to the point of virtually touching, or could be further apart than what is shown in FIG. 2B. In operation and according to one possible embodiment, a leading, first separator finger 11a moves up through a gap 213 between the first and second conveyor belt structures 210, 211 and in front of a package. After the package and the first separator finger 11a move a sufficient distance forward, a trailing, second separator finger 11b moves up through the gap 213 and in back of the package. The separator fingers 11a, 11b are at this point disposed with the first separator finger 11a in front of the package and the second separator finger 11a in back of the package, such as shown in either FIG. 3 or 4. The separator fingers 11a, 11b travel along the second conveyor belt structure 211 with the package between them until the first separator finger 11a reaches the gap 214 between the second and third conveyor belt structures 211, 212. The first separator finger 11a moves down through the gap 214 while the package travels onto the third conveyor belt structure 212. At this point the second separator finger 11b, according to at least one possible embodiment, could assist the second conveyor belt structure 211 in moving the package by pushing the package onto the third conveyor belt structure 212, although the package could be moved only by the second conveyor belt structure 211 onto the third conveyor belt structure 212. The second separator finger 11b then follows the same path as the first separator finger 11a down through the gap 214. It should be understood that the preceding description is for one possible embodiment and should not be construed as limiting other possible embodiments disclosed herein.

Figure 3:
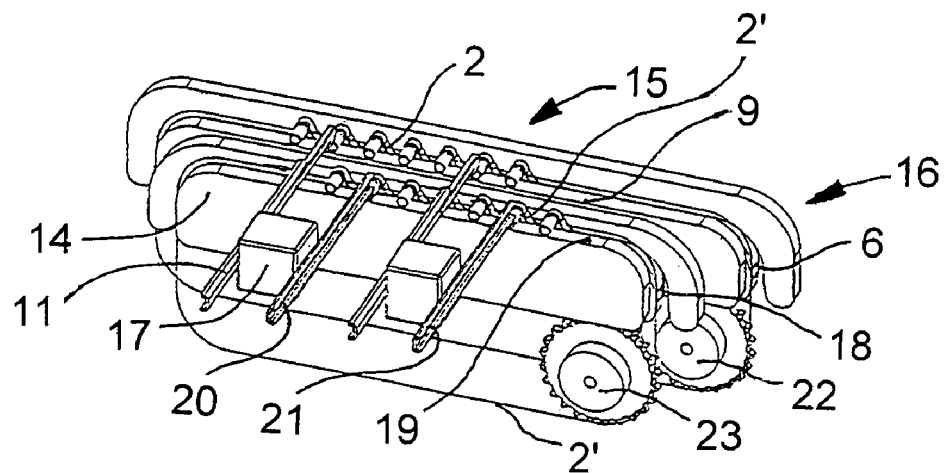
FIG. 3 shows the separator fingers in combination with clamping fingers and small packaged goods.
Figure 4:
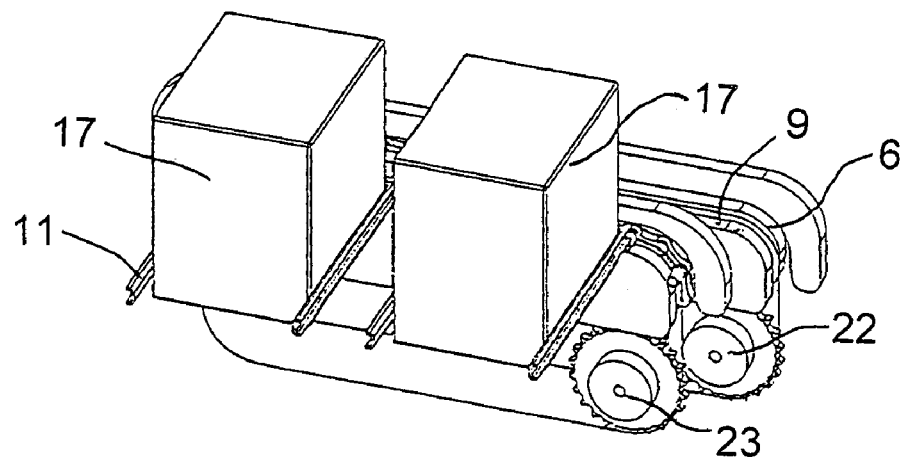
FIG. 4 shows the separator fingers in combination with clamping fingers and large packaged goods.

As shown in FIGS. 3 and 4, associated with the first pair of guide tracks 6, 9 for the actual spacing and calibration of the separator fingers 11 is an additional pair of such guide tracks 18, 19 with an additional conveyor chain 2'. This additional pair is also provided for the control and guidance of additional guide and clamping fingers 20, 21. This pair, as shown in FIG. 3, can be located on the same side as the first pair or on the other side of the conveyor opposite the first pair. The interaction of these fingers 11, 20, 21 is designed so that the separator fingers 11 perform a pushing and separating action during the separating process, and the guide and clamping fingers 20, 21 perform a centering or positioning action. At least one possible embodiment teaches that the spacing of the packaged goods 17 and their centering or clamping are executed chronologically simultaneously or approximately chronologically simultaneously to each other. The conveyor chains 2, 2' are advantageously each driven by their own motors 22, 23 respectively. The motors in question can be a synchronous motor, a servomotor or a stepper motor, the direction of rotation, speed, partial or total angle of rotation and additional parameters of which are specified by a computer or by another suitable control device. The control device is appropriately connected electrically or by means of the control system with the control device of a packing machine which can serve as a lead machine, so that the separating device can be adjusted immediately and automatically to the various tasks at hand.

With larger or heavier package goods 17 in particular, at least one pair of guide tracks 6, 9 and 18, 19 can be located on opposite sides of the conveyor, whereby the separator and/or guide fingers 11, 20, 21 are realized in the form of transverse bars that are guided above or across the conveyor.

Instead of the flat-link chain 2, 2' described above, other suitable link chains, toothed belts or similar transport means can be provided with correspondingly located and oriented separating and guide fingers 11, 20, 21.

Figure 5:
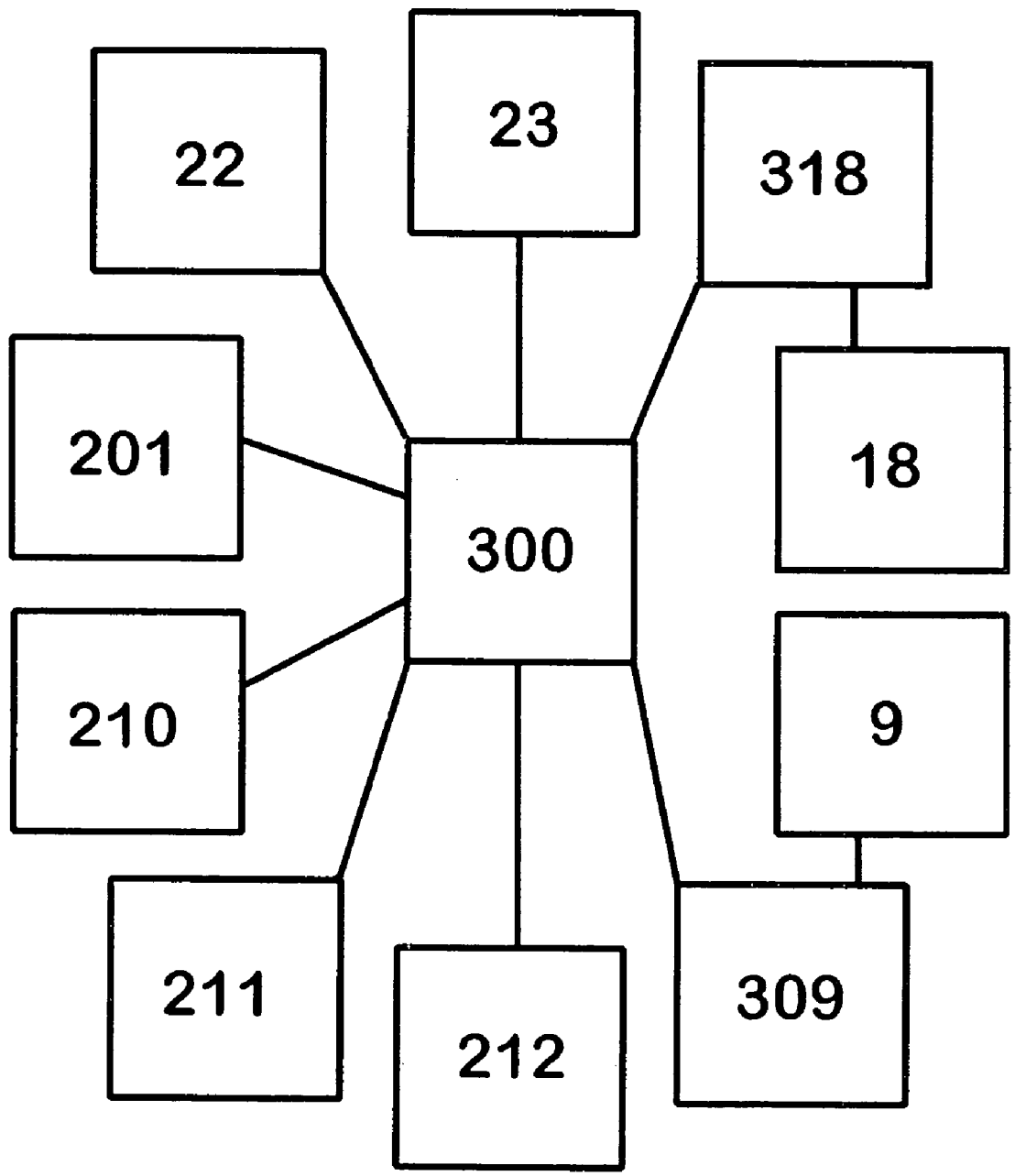
FIG. 5 shows a box drawing representative of a control system for controlling various components of the package separating and compacting device according to at least one possible embodiment.

FIG. 5 shows a box drawing representative of a control system 300 for controlling various components of the package separating and compacting device according to at least one possible embodiment. The following components are represented by boxes: the second guide track 9, the guide track 18, the motors 22, 23, the chain adjuster 201, and the first, second, and third conveyor belt structures 210, 211, 212. Additionally, a first adjustment mechanism 309 and a second adjustment mechanism 318 are shown. The first adjustment mechanism 309 is operatively connected to the second guide track 9 to move the second guide track 9. The adjustment mechanism 309 is designed to move the second guide track 9 any number of positions to adjust the spacing between adjacent separator fingers 11. For example, according to at least one embodiment, the adjustment mechanism 309 can move the second guide track 9 between only a first and a second position, such as those shown in FIGS. 1 and 2. Alternatively, the adjustment mechanism 309 could move the second guide track 9 to a plurality of positions. In this manner, a variety of distances between adjacent separator fingers 11 could be achieved to permit handling of containers or packages of various sizes and/or shapes. The adjustment mechanism 318 is operatively connected to the guide track 18 in the same manner and for the same purpose as the adjustment mechanism 309 is operatively connected to the guide track 9.

During operation of the overall package separating and compacting device, the control system 300 is connected, in at least one possible embodiment, to the various components to control various operations thereof. For example, the control system 300 is connected to the conveyor belt structures 210, 211, 212 to control their movement. According to at least one possible embodiment, the speed of the conveyor belt structures 210, 211, 212 could be varied individually or collectively to be faster or slower, or constant or intermittent. In a similar manner, the control system 300 could control the operation of the motors 22, 23 to control the speed and movement of the corresponding chains and separator fingers. Also, the chain adjuster 201 could be controlled by the control system 300. Finally, the adjustment mechanisms 309, 318 could be controlled by the control system 300 to control the movement and positioning of the guide tracks 9, 18. The control system 300 could be programmed to adjust the operation of these various components as desired to permit the handling of various packages of different shapes and/or sizes. The control system 300 coordinates the operation of the various components so that the components work together to handle the packages quickly, accurately, and efficiently.

Figure 2C:
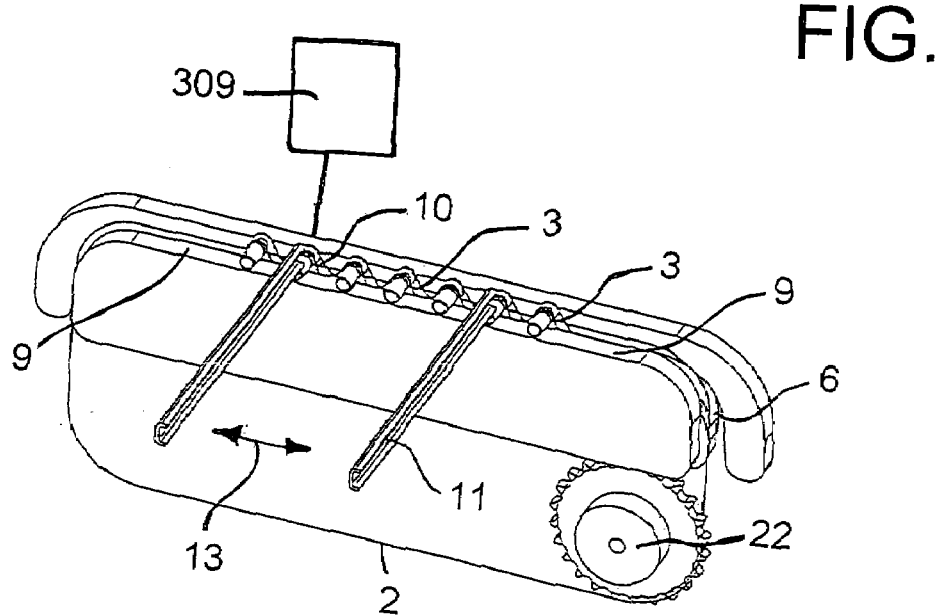
FIG. 2C shows one possible embodiment of the package separating and compacting device with an adjustment mechanism.

FIG. 2C shows one possible embodiment of the package separating and compacting device with the adjustment mechanism 309 operatively connected to the guide track 9. The adjustment mechanism 309, as discussed above, moves the guide track 9 vertically or up and down to adjust the chain 2 and thus the spacing of the separator fingers or elements 11.

Figure 2D:
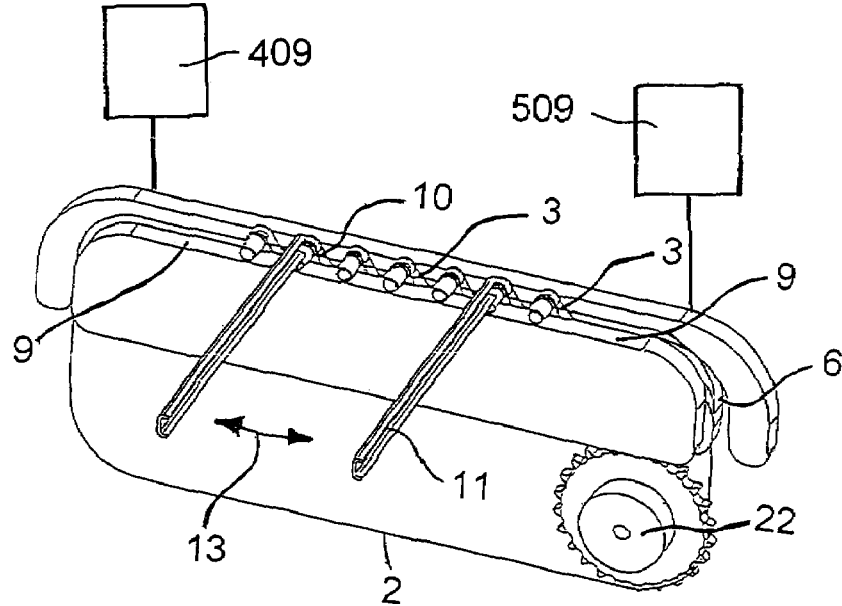
FIG. 2D shows one possible embodiment of the package separating and compacting device with an adjustment mechanism having two adjustment devices.
Figure 6:
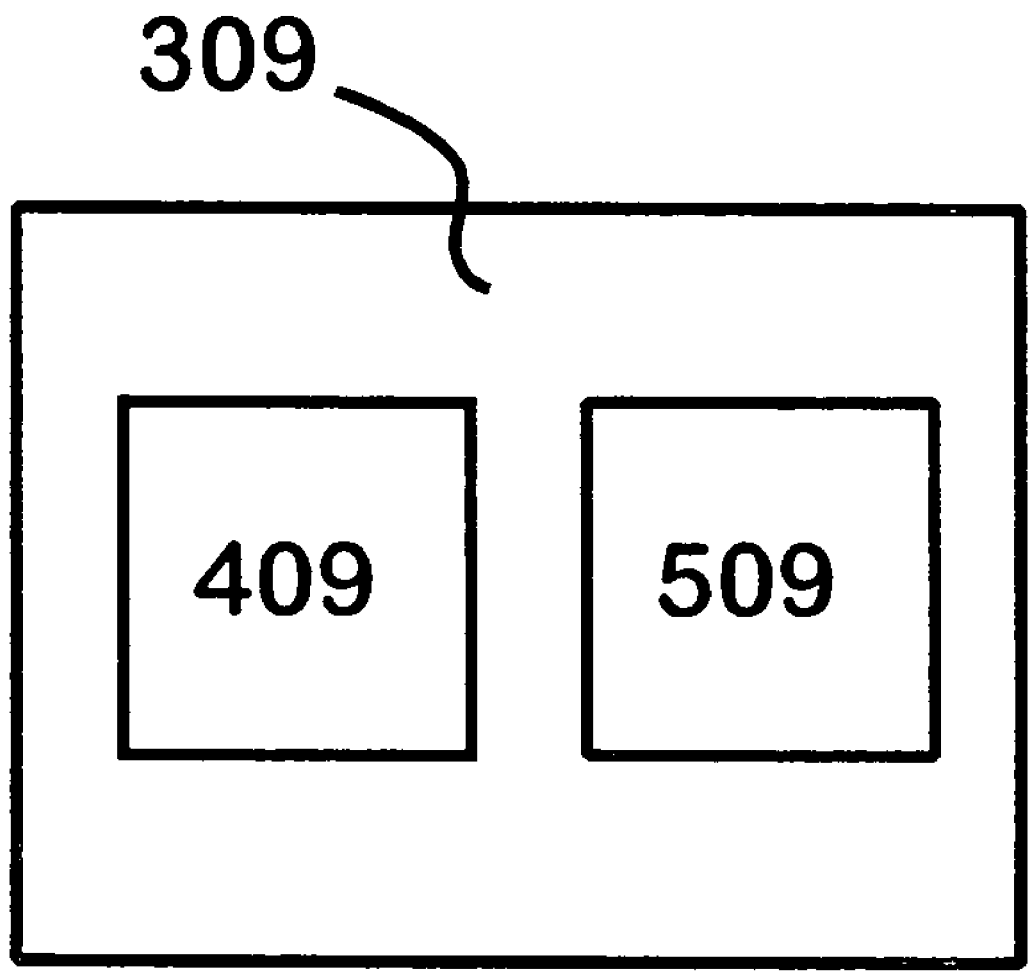
FIG. 6 shows a box drawing representative of an adjustment mechanism that has two individual adjustment devices.

In addition, according to at least one possible embodiment, the adjustment mechanism 309 can tilt the guide track 9 by lowering or raising one end of the guide track 9 at the entrance area 14 or the other end of the guide track 9 at the outlet area 16. This tilting can be accomplished, according to at least one possible embodiment, by using an adjustment mechanism that has two individual adjustment devices 409, 509, which are shown by themselves in FIG. 2D, and which are also shown schematically in FIG. 6 as part of the adjustment mechanism 309. According to one possible embodiment, for example, the adjustment device 509 tilts the guide track 9 by lowering the end of the guide track 9 near the outlet area 16, while the other adjustment device 409 retains the end of the guide track 9 near the entrance area 14. In this manner, the spacing of adjacent separator fingers 11 would become smaller as the separator fingers 11 travel from the entrance area 14 to the outlet area 16 since the distance between adjacent links in the chain 2 would lessen, such as shown in FIGS. 2 and 3. Such a decreasing of the space between adjacent separator fingers 11 could be desirable in some situations. For example, it may be desirable to use a wider spacing initially so as to essentially ensure that the packages will be located in between two adjacent separator fingers 11 before lessening the space to enclose the packages on either side, such as shown in FIGS. 3 and 4, as they approach the outlet area 16. Further, if the approaching packages are somewhat irregularly spaced, there could be the danger that the separator fingers 11, as they circulate up and in between packages, could contact the bottom of one of the irregularly-spaced packages and either disrupt its position or even knock it over. A wider initial spacing may help compensate for irregularities in packing spaces by leaving room for misplaced packages before tightening up the position of the separator fingers 11 with respect to the package, whereas a uniform, close spacing designed to position the separator fingers 11 close to the sides of the package may not.

According to another possible embodiment, the adjustment device 409 could tilt the guide track 9 by lowering the end of the guide track 9 near the entrance area 14, while the other adjustment device 509 retains the end of the guide track 9 near the outlet area 16. Such an adjustment would result in a spacing of the separator fingers 11 that increases in size from the entrance area 14 to the outlet area 16. This adjustment could be used in the event of a change in package size from larger to smaller. To further explain, as the larger packages are exiting the and the smaller packages are entering, an adjustment could be performed by the adjustment device 409 to accommodate the smaller packages by decreasing the space between adjacent separator fingers 11, while the other adjustment device 509 keeps the spacing larger for the larger packages that are exiting. As the larger packages exit and the smaller packages travel toward the outlet area 16, an adjustment by the adjustment device 509 could be performed so as to complete the transition to handling smaller packages. Of course, the opposite could be performed for the switch from smaller to larger packages.

The adjustment mechanism 309 and/or the adjustment devices 409, 509, according to at least one possible embodiment, could utilize hydraulic, pneumatic, or mechanical lifting devices or drives. Electric motors, such as synchronous motors, servomotors, or stepper motors, could also be used. All of the above could be coordinated and controlled by the control system 300.

The invention, according to at least one possible embodiment, relates to a device for the separation into lots, spacing and grouping of packaged goods, boxes, workpieces or items such as bottles, cans and similar containers with a conveyor, on which a stream of items is guided and with separating elements that interact with said conveyor and can be moved so that they are engaged at a predetermined spot on the conveyor behind or between the packaged goods and separate said packaged goods into individual units, rows or groups, whereby the distances between the separating elements are variable, and different group sizes can be created and the separator elements or separator fingers are held on conveyors or conveyor chains that preferably circulate independently of the item conveyor, and is characterized in that the conveyor chain 2 is guided with a first flat link bearing 4 in a first plane 6 and is guided with a corresponding additional flat link bearing 7 in a second plane 9, and the first and second planes 6, 9 can be moved to a uniform and variable spacing with respect to one another.

One feature or aspect of an embodiment is believed at the time of the filing of this patent application to possibly reside broadly in a device for the separation into lots, spacing and grouping of packaged goods, boxes, workpieces or items such as bottles, cans and similar containers with a conveyor, on which a stream of items is guided and with separating elements that interact with said conveyor and can be moved so that they are engaged at a predetermined spot on the conveyor behind or between the packaged goods and separate said packaged goods into individual units, rows or groups, whereby the distances between the separating elements are variable, and different group sizes can be created and the separator elements or separator fingers are held on conveyors or conveyor chains that preferably circulate independently of the item conveyor, characterized in that the conveyor chain 2 is guided with a first flat link bearing 4 in a first plane 6 and is guided with a corresponding additional flat link bearing 7 in a second plane 9, and the first and second planes 6, 9 can be moved to a uniform and variable spacing with respect to one another.

Another feature or aspect of an embodiment is believed at the time of the filing of this patent application to possibly reside broadly in the device, wherein the conveyor chain 2 has a first flat link bearing 4 or link bearing with slide means 5 that are guided on guide tracks, and the corresponding additional flat link bearing 7 holds the respective separator finger 11 and can be moved with its slide means 8 along a second guide track 9, and at least the second track is mounted so that it can move relative to the first track in terms of height to change the spacing 12, 13 between the separator fingers 11.

Yet another feature or aspect of an embodiment is believed at the time of the filing of this patent application to possibly reside broadly in the device, wherein the flat links 3 in a linear extension that correspond to one another can be continuously adjusted to an acute-angle extension.

Still another feature or aspect of an embodiment is believed at the time of the filing of this patent application to possibly reside broadly in the device, wherein the angular adjustment is defined by a variation of the distance between the guide tracks 6, 9.

A further feature or aspect of an embodiment is believed at the time of the filing of this patent application to possibly reside broadly in the device, wherein associated with the first flat link bearing 4 of the conveyor chain 2 is a bearing or sliding pin 5 which is guided on a stationary guide track 6, and an additional flat link bearing 7 likewise has an additional sliding pin 8 which is guided on an adjustable-height second guide track 9, and the actual separator finger 11 is associated with one of these additional flat link bearings 7.

Another feature or aspect of an embodiment is believed at the time of the filing of this patent application to possibly reside broadly in the device, wherein the separator finger 11 is mounted equi-axially with respect to the sliding pin 8.

Yet another feature or aspect of an embodiment is believed at the time of the filing of this patent application to possibly reside broadly in the device, wherein at least the first guide track 6 is realized in the form of a groove cam track.

Still another feature or aspect of an embodiment is believed at the time of the filing of this patent application to possibly reside broadly in the device, wherein both guide tracks 6, 9 are realized in the form of at least partly closed groove cam tracks.

A further feature or aspect of an embodiment is believed at the time of the filing of this patent application to possibly reside broadly in the device, wherein the separator fingers 11 can be brought into contact in the direction of transport behind the packaged goods 17.

Another feature or aspect of an embodiment is believed at the time of the filing of this patent application to possibly reside broadly in the device, wherein the separator fingers 11 exert a pushing and separating action on the packaged goods 17, and are functionally connected with additional centering and/or synchronizing fingers 20, 21.

Yet another feature or aspect of an embodiment is believed at the time of the filing of this patent application to possibly reside broadly in the device, wherein associated with the first pair of guide tracks 6, 9 for the spacing of the separator fingers 11 is an additional pair of such guide tracks 18, 19, which is provided exclusively for the control and steering of additional guide and/or clamping fingers 20, 21.

Still another feature or aspect of an embodiment is believed at the time of the filing of this patent application to possibly reside broadly in the device with a single-strand or multi-strand dividing belt, a downstream accelerator belt and an additional conveyor, wherein with the additional conveyor, the separator fingers 11 can be inserted behind the packaged goods 17 to achieve the actual spacing, and in the same or a downstream segment of the conveyor, the packaged goods 17 can be clamped.

A further feature or aspect of an embodiment is believed at the time of the filing of this patent application to possibly reside broadly in the device, wherein at least the spacing guide track 9 is mounted so that its initial or total area 14, 15 can be tilted.

Another feature or aspect of an embodiment is believed at the time of the filing of this patent application to possibly reside broadly in the device, wherein the guide track 9 that forms the spacing is mounted so that its outlet-side area 16 can be tilted.

Yet another feature or aspect of an embodiment is believed at the time of the filing of this patent application to possibly reside broadly in the device, wherein both guide tracks 6, 9, 18, 19 are mounted on the conveyor so that they can be jointly adjusted vertically to adapt to different insertion positions of the separating and centering fingers.

Still another feature or aspect of an embodiment is believed at the time of the filing of this patent application to possibly reside broadly in the device, wherein the spacing of the separator fingers and/or their insertion position in relation to the packaged goods 17 being processed can be adjusted automatically.

A further feature or aspect of an embodiment is believed at the time of the filing of this patent application to possibly reside broadly in the device, wherein an automatic adjustment of the upstream separating device 1 can be made by entering the desired formation into the associated packing machine.

Another feature or aspect of an embodiment is believed at the time of the filing of this patent application to possibly reside broadly in the device, wherein the change in the chain length that results when there is a change in the angle of the flat links 3 to change the spacing 12, 13 between the fingers 11, 20, 21 can be compensated by means of a chain take-up.

Yet another feature or aspect of an embodiment is believed at the time of the filing of this patent application to possibly reside broadly in the device, wherein at least one pair of guide tracks 8, 9 and 18, 19 are located on each of the facing sides of a conveyor, and the guide fingers 11, 20, 21 are realized in the form of transverse rods that extend outward from them.

Still another feature or aspect of an embodiment is believed at the time of the filing of this patent application to possibly reside broadly in the device, wherein the spacing of the packaged goods 17 and their centering and/or clamping occurs chronologically simultaneously or approximately chronologically simultaneously.

The components disclosed in the various publications, disclosed or incorporated by reference herein, may possibly be used in possible embodiments of the present invention, as well as equivalents thereof.

Some examples of stepping motors that may possibly be utilized or possibly adapted for use in at least one possible embodiment of the present application may possibly be found in the following U.S. patents: U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of servo-motors that may possibly be utilized or possibly adapted for use in at least one possible embodiment of the present application may possibly be found in the following U.S. patents: U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025 issued to Yasui on Feb. 15, 2000.

The appended drawings in their entirety, including all dimensions, proportions and/or shapes in at least one embodiment of the invention, are accurate and are hereby included by reference into this specification.

Some examples of synchronous motors which may possibly be utilized or adapted for use in at least one possible embodiment may possibly be found in the following U.S. patents: U.S. Pat. No. 6,713,899, entitled "Linear synchronous motor;" U.S. Pat. No. 6,486,581, entitled "Interior permanent magnet synchronous motor;" U.S. Pat. No. 6,424,114, entitled "Synchronous motor;" U.S. Pat. No. 6,388,353, entitled "Elongated permanent magnet synchronous motor;" U.S. Pat. No. 6,329,728, entitled "Cylinder-type linear synchronous motor;" U.S. Pat. No. 6,025,659, entitled "Synchronous motor with movable part having permanent magnets;" U.S. Pat. No. 5,936,322, entitled "Permanent magnet type synchronous motor;" and U.S. Pat. No. 5,448,123, entitled "Electric synchronous motor."

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of computer systems that may possibly be utilized or possibly adapted for use in at least one possible embodiment of the present application may possibly be found in the following U.S. patents: U.S. Pat. No. 5,416,480 issued to Roach et al. on May 16, 1995; U.S. Pat. No. 5,479,355 issued to Hyduke on Dec. 26, 1995; U.S. Pat. No. 5,481,730 issued to Brown et al. on Jan. 2, 1996; U.S. Pat. No. 5,805,094 issued to Roach et al. on Sep. 8, 1998; U.S. Pat. No. 5,881,227 issued to Atkinson et al. on Mar. 9, 1999; and U.S. Pat. No. 6,072,462 issued to Moshovich on Jun. 6, 2000.

All, or substantially all, of the components and methods of the various embodiments may be used with at least one embodiment or all of the embodiments, if more than one embodiment is described herein.

Some examples of bottling and container handling systems and components thereof which may possibly be utilized or adapted for use in at least one possible embodiment, may possibly be found in the following U.S. patents: U.S. Pat. No. 6,484,477, entitled "Capping Machine for Capping and Closing Containers, and a Method for Closing Containers;" U.S. Pat. No. 6,474,368, entitled "Beverage Container Filling Machine, and Method for Filling Containers with a Liquid Filling Material in a Beverage Container Filling Machine;" U.S. Pat. No. 6,494,238, entitled "A Plant for Filling Beverage into Beverage Bottles Other Beverage Containers Having Apparatus for Replacing Remaining Air Volume in Filled Beverage Bottles or Other Beverage Containers;" U.S. Pat. No. 6,470,922, entitled "Apparatus for the Recovery of an Inert Gas;" U.S. Pat. No. 6,463,964, entitled "Method of Operating a Plant for Filling Bottles, Cans or the like Beverage Containers with a Beverage, and a Beverage Container Filling Machine;" U.S. Pat. No. 6,834,473, entitled "Bottling Plant and Method of Operating a Bottling Plant and a Bottling Plant with Sections for Stabilizing the Bottled Product;" U.S. Pat. No. 6,484,762, entitled "A Filling System with Post-dripping Prevention;" and U.S. Pat. No. 6,668,877, entitled "Filling System for Still Beverages."

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of bottling and container handling systems and components thereof which may possibly be utilized or adapted for use in at least one possible embodiment, may possibly be found in the following U.S. patent applications: Ser. No. 10/653,617, filed on Sep. 2, 2003, entitled "Labeling Machine with a Sleeve Mechanism for Preparing and Applying Cylindrical Labels onto Beverage Bottles and Other Beverage Containers in a Beverage Container Filling Plant;" Ser. No. 10/666,931, filed on Sep. 18, 2003, entitled "Beverage Bottling Plant for Filling Bottles with a Liquid Beverage Filling Material and a Labelling Station for Filled Bottles and Other Containers;" Ser. No. 10/723,451, filed on Nov. 26, 2003, entitled "Beverage Bottling Plant for Filling Beverage Bottles or Other Beverage Containers with a Liquid Beverage Filling Material and Arrangement for Dividing and Separating of a Stream of Beverage Bottles or Other Beverage Containers;" Ser. No. 10/739,895, filed on Dec. 18, 2003, entitled "Method of Operating a Beverage Container Filling Plant with a Labeling Machine for Labeling Beverage Containers Such as Bottles and Cans, and a Beverage Container Filling Plant with a Labeling Machine for Labeling Beverage Containers Such as Bottles and Cans;" Ser. No. 10/756,171, filed on Jan. 13, 2004, entitled "A Beverage Bottling Plant for Filling Bottles and like Containers with a Liquid Beverage Filling Material and a Conveyer Arrangement for Aligning and Distributing Packages Containing Filled Bottles and like Containers;" Ser. No. 10/780,280, entitled "A Beverage Bottling Plant for Filling Bottles with a Liquid Beverage Filling Material, a Container Filling Plant Container Information Adding Station, Such As, a Labeling Station, Configured to Add Information to Containers, Such As, Bottles and Cans, and Modules for Labeling Stations;" Ser. No. 10/786,256, entitled "A Beverage Bottling Plant for Filling Bottles with a Liquid Beverage Filling Material, and a Container Filling Lifting Device for Pressing Containers to Container Filling Machines;" Ser. No. 10/793,659, entitled "A Beverage Bottling Plant for Filling Bottles with a Liquid Beverage Filling Material, and a Container Filling Plant Container Information Adding Station, Such As, a Labeling Station Having a Sleeve Label Cutting Arrangement, Configured to Add Information to Containers, Such As, Bottles and Cans;" Ser. No. 10/801, 924, filed on Mar. 16, 2004, entitled "Beverage Bottling Plant for Filling Bottles with a Liquid Beverage Filling Material, and a Cleaning Device for Cleaning Bottles in a Beverage Bottling Plant;" Ser. No. 10/813,651, filed on Mar. 30, 2004, entitled "A Beverage Bottling Plant for Filling Bottles with a Liquid Beverage Filling Material, and an Easily Cleaned Lifting Device in a Beverage Bottling Plant;" Ser. No. 10/814, 624, filed on Mar. 31, 2004, entitled "A Beverage Bottling Plant for Filling Bottles with a Liquid Beverage Filling Material, and a Container Filling Plant Container Information Adding Station, Such As, a Labeling Station Having a Gripper Arrangement, Configured to Add Information to Containers, Such As, Bottles and Cans;" Ser. No. 10/816,787, filed on Apr. 2, 2004, entitled "A Beverage Bottling Plant for Filling Bottles with a Liquid Beverage Filling Material, and Apparatus for Attaching Carrying Grips to Containers with Filled Bottles;" Ser. No. 10/865,240, filed on, Jun. 10, 2004, Entitled "A Beverage Bottling Plant for Filling Bottles with a Liquid Beverage Filling Material, a Beverage Container Filling Machine, and a Beverage Container Closing Machine;" Ser. No. 10/883,591, filed on Jul. 1, 2004, entitled "A Beverage Bottling Plant for Filling Bottles with a Liquid Beverage Filling Material Having a Container Filling Plant Container Information Adding Station, Such As, a Labeling Station, Configured to Add Information to Containers, Such As, Bottles and Cans, and Modules for Labeling Stations and a Bottling Plant Having a Mobile Module Carrier;" Ser. No. 10/930,678, filed on Aug. 31, 2004, entitled "A Beverage Bottling Plant for Filling Bottles with a Liquid Beverage Filling Material, a Container Filling Plant Container Filling Machine, and a Filter Apparatus for Filtering a Liquid Beverage;" Ser. No. 10/931,817, filed on Sep. 1, 2004, entitled "A Beverage Bottling Plant for Filling Bottles with a Liquid Beverage Filling Material, Having an Apparatus for Exchanging Operating Units Disposed at Rotating Container Handling Machines;" Ser. No. 10/939,170, filed on Sep. 10, 2004; Ser. No. 10/954,012, filed on Sep. 29, 2004; Ser. No. 10/952,706; Ser. No. 10/962,183, filed on Oct. 8, 2004; Ser. No. 10/967,016, filed on Oct. 15, 2004; Ser. No. 10/982,706, filed on Nov. 5, 2004; Ser. No. 10/982,694; Ser. No. 10/982, 710; Ser. No. 10/984677, filed on Nov. 9, 2004; Ser. No. 10/985,640, filed on Nov. 10, 2004; Ser. No. 11/004,663, filed on Dec. 3, 2004; No. 11/009,551, filed on Dec. 10, 2004; Ser. No. 11/012,859, filed on Dec. 15, 2004; Ser. No. 11/014,673, filed on Dec. 16, 2004; Ser. No. 11/016,364, filed on Dec. 17, 2004; and No. 11/016,363.

All of the patents, patent applications and publications recited herein, and in the Declaration attached hereto, are hereby incorporated by reference as if set forth in their entirety herein.

An example of a chain adjuster or components thereof that may possibly be utilized or possibly adapted for use in at least one possible embodiment of the present application may possibly be found in U.S. Pat. No. 4,527,655, entitled "Drive Chain Adjuster."

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application. . ." may possibly not be used or useable in any one or more embodiments of the application.

The sentence immediately above relates to patents, published patent applications and other documents either incorporated by reference or not incorporated by reference.

All of the patents, patent applications or patent publications, which were cited in the Search Report for the corresponding German Patent Application No. 10 2005 026 639.8 filed on Jun. 9, 2005, and/or cited elsewhere are hereby incorporated by reference as if set forth in their entirety herein as follows: U.S. Pat. No. 4,227,606; EP 1 232 969 A1; US 2001/0019006 A1; DE 2 110 819 A1; DE 103 47 540 A1; and DE 694 18 497 T2.

The corresponding foreign and international patent publication applications, namely, Federal Republic of Germany Patent Application No. 10 2005 026 639.8 filed on Jun. 9, 2005, having inventors Tilo LECHNER and Ludger PAULS, and DE-OS 10 2005 026 639.8 and DE-PS 10 2005 026 639.8, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A container handling machine for maintaining separation and also spacing of groups of containers and for grouping containers into groups having a desired outer perimeter shape and outer perimeter size and dimensions, said container handling machine comprising:

a conveyor being configured and disposed to convey containers through said container handling machine along a direction of movement of said conveyor;

said conveyor having a length and a width, said length being substantially greater than said width;

said length of said conveyor being disposed substantially parallel to the direction of movement of said conveyor;

a first guide and a second guide;

said first guide being disposed adjacent said conveyor, and being disposed between said conveyor and said second guide;

a conveyor chain being configured and disposed to circulate adjacent to said conveyor, a portion of which conveyor chain is configured and disposed to move in the same direction of movement as a portion of said conveyor that conveys containers thereon;

a motor being connected to said conveyor chain to drive said conveyor chain;

said conveyor chain comprising a plurality of links joined to each other end-to-end by connectors disposed at the ends of said links;

each of said connectors being configured to permit pivoting rotation of its two joined links with respect to one another;

said connectors comprising a first plurality of projections and a second plurality of projections being disposed to project from said connectors;

each of said first plurality of projections and said second plurality of projections having a length, a height, and a width, said length being greater than said height or width;

each of said first plurality of projections being disposed between a pair of said second plurality of projections, and each of said second plurality of projections being disposed between a pair of said first plurality of projections;

said first guide comprising an elongated guide structure having a length and a width, said length being substantially greater than said width and being disposed substantially parallel to said length of said conveyor;

said first plurality of projections being configured and disposed to project across said guide structure of said first guide with their length disposed transverse to said length of said guide structure of said first guide;

said first plurality of projections being configured and disposed to be guided by said guide structure of said first guide and to be moved along said length of said guide structure of said first guide;

said second guide comprising an elongated guide structure having a length and a width, said length being substantially greater than said width and being disposed substantially parallel to said length of said conveyor;

said second plurality of projections being configured and disposed to project across said guide structure of said second guide with their length disposed transverse to said length of said guide structure of said second guide;

said second plurality of projections being configured and disposed to be guided by said guide structure of said second guide and to be moved along said length of said guide structure of said second guide;

a plurality of elongated guide elements having a length, a height, and a width, said length being substantially greater than said height or width;

each of said guide elements being connected to and being disposed to project from a corresponding one of said first plurality of projections over and across said width of said conveyor with its length substantially transverse to said length of said conveyor;

each of said guide elements being configured and disposed to be moved by said conveyor chain to contact and group containers into groups on said conveyor; and at least one of said guide structures is movable up and down with respect to the other of said guide structures to move its corresponding one of said first and second pluralities of projections up and down with respect to the other of said first and second pluralities of projections to thus shorten or lengthen said conveyor chain to thus shorten or lengthen the space between successive guide elements to thus permit grouping of containers into groups having at least one of: different numbers of containers, different outer perimeter shapes, and different outer perimeter sizes and dimensions.

2. The container handling machine according to claim 1, wherein:

each of said guide elements is mounted co-axially on its corresponding projection;

each of said guide surfaces comprises a grooved cam track; and said motor is configured to drive said conveyor chain at a speed greater than the speed of movement of said conveyor to thus move each of said guide elements at a speed greater than the speed of movement of said conveyor to approach and contact a group of containers ahead of said guide element on said conveyor to push and further separate the group of containers from a subsequent group of containers and to compact the group of containers.

3. The container handling machine according to claim 2, wherein:

said guide structure of said first guide comprises a first end and a second end disposed opposite one another; and said first end and said second end of said guide structure of said first guide are individually movable up and down to permit tilting of said guide structure.

4. The container handling machine according to claim 3, wherein:

each of said guide structures is movable up and down with respect to each other;

the spacing of successive guide elements is adjustable by one of: an automatic control computer or manually input of a desired container group formation into the control computer; and said container handling machine comprises a chain take-up to compensate for the lengthening and shortening of said conveyor chain.

5. The container handling machine according to claim 1, wherein said container handling machine further comprises:

a third guide and a fourth guide, wherein said pair of first and second guides and said pair of third and fourth guides are disposed on opposite sides of said conveyor disposed between said pairs of guides;

said third guide being disposed adjacent said conveyor, and being disposed between said conveyor and said fourth guide;

said conveyor chain comprises a first conveyor chain;

a second conveyor chain being configured and disposed to circulate adjacent to said conveyor on an opposite side of said conveyor from said first conveyor chain, a portion of which said second conveyor chain is configured and disposed to move in the same direction of movement as a portion of said conveyor that conveys containers thereon;

a second motor being connected to said second conveyor chain to drive said second conveyor chain;

said second conveyor chain comprising a plurality of links joined to each other end-to-end by connectors disposed at the ends of said links;

each of said connectors of said second conveyor chain being configured to permit pivoting rotation of its two joined links with respect to one another;

said connectors of said second conveyor chain comprising a third plurality of projections and a fourth plurality of projections being disposed to project from said connectors of said second conveyor chain;

each of said third plurality of projections and said fourth plurality of projections having a length, a height, and a width, said length being greater than said height or width;

each of said third plurality of projections being disposed between a pair of said fourth plurality of projections, and each of said fourth plurality of projections being disposed between a pair of said third plurality of projections;

said third guide comprising an elongated guide structure having a length and a width, said length being substantially greater than said width and being disposed substantially parallel to said length of said conveyor;

said third plurality of projections being configured and disposed to project across said guide structure of said third guide with their length disposed transverse to said length of said guide structure of said third guide;

said third plurality of projections being configured and disposed to be guided by and to be moved on said guide structure of said third guide along said length of said guide structure of said third guide;

said fourth guide comprising an elongated guide structure having a length and a width, said length being substantially greater than said width and being disposed substantially parallel to said length of said conveyor;

said fourth plurality of projections being configured and disposed to project across said guide structure of said fourth guide with their length disposed transverse to said length of said guide structure of said fourth guide;

said fourth plurality of projections being configured and disposed to be guided by said guide structure of said fourth guide and to be moved along said length of said guide structure of said fourth guide;

each of said guide elements comprising a guide bar;

each of said guide bars also being connected to and being disposed to project from a corresponding one of said third plurality of projections over and across said width of said conveyor with its length substantially transverse to said length of said conveyor, such that each of said guide bars is connected on one end with a projection of said first plurality of projections and on an opposite end with a projection of said third plurality of projections;

each of said guide rods being configured and disposed to be moved by said first and second conveyor chains to contact and compact containers into groups on said conveyor;

at least one of said third and fourth guide structures is movable up and down with respect to the other of said third and fourth guide structures to move its corresponding one of said third and fourth pluralities of projections up and down with respect to the other of said third and fourth pluralities of projections to thus shorten or lengthen said second conveyor chain to thus shorten or lengthen the space between successive guide rods to thus permit grouping of containers into groups having at least one of: different numbers of containers, different outer perimeter shapes, and different outer perimeter sizes and dimensional; and at least one of: said first guide structure is movable essentially simultaneously with said third guide structure, and said second guide structure is movable essentially simultaneously with said fourth guide structure.

6. The container handling machine according to claim 5, wherein:

each of said guide rods is mounted co-axially on its corresponding projection;

each of said guide structures comprises a grooved cam track; and said motors are configured to drive said conveyor chains at a speed greater than the speed of movement of said conveyor to thus move each of said guide rods at a speed greater than the speed of movement of said conveyor to approach and contact a group of containers ahead of said guide rod on said conveyor to push and further separate the group of containers from a subsequent group of containers and to compact the group of containers.

7. The container handling machine according to claim 6, wherein:

said guide structure of each of said first guide and said third guide comprises a first end and a second end disposed opposite one another;

said first end and said second end of said guide structure of each of said first guide and said third guide are individually movable up and down to permit tilting of said guide structure;

the spacing of successive guide rods is adjustable by one of: an automatic control computer or manually input of a desired container group formation into the control computer; and said container handling machine comprises at least one chain take-up to compensate for the lengthening and shortening of said conveyor chains.

8. The container handling machine according to claim 1, wherein said container handling machine further comprises:

a third guide and a fourth guide disposed adjacent said pair of first and second guides, wherein said pair of first and second guides is disposed between said pair of third and fourth guides and said conveyor;

said third guide being disposed between said second guide and said fourth guide;

said conveyor chain comprises a first conveyor chain;

a second conveyor chain being configured and disposed to circulate in the same direction as said first conveyor chain;

a second motor being connected to said second conveyor chain to drive said second conveyor chain;

said second conveyor chain comprising a plurality of links joined to each other end-to-end by connectors disposed at the ends of said links;

each of said connectors of said second conveyor chain being configured to permit pivoting rotation of its two joined links with respect to one another;

said connectors of said second conveyor chain comprising a third plurality of projections and a fourth plurality of projections being disposed to project from said connectors of said second conveyor chain;

each of said third plurality of projections and said fourth plurality of projections having a length, a height, and a width, said length being greater than said height or width;

each of said third plurality of projections being disposed between a pair of said fourth plurality of projections, and each of said fourth plurality of projections being disposed between a pair of said third plurality of projections;

said third guide comprising an elongated guide structure having a length and a width, said length being substantially greater than said width and being disposed substantially parallel to said length of said conveyor;

said third plurality of projections being configured and disposed to project across said guide structure of said third guide with their length disposed transverse to said length of said guide structure of said third guide;

said third plurality of projections being configured and disposed to be guided by and to be moved on said guide structure of said third guide along said length of said guide structure of said third guide;

said fourth guide comprising an elongated guide structure having a length and a width, said length being substantially greater than said width and being disposed substantially parallel to said length of said conveyor;

said fourth plurality of projections being configured and disposed to project across said guide structure of said fourth guide with their length disposed transverse to said length of said guide structure of said fourth guide;

said fourth plurality of projections being configured and disposed to be guided by said guide structure of said fourth guide and to be moved along said length of said guide structure of said fourth guide;

said plurality of elongated guide elements comprises a first plurality of elongated guide elements;

a second plurality of elongated guide elements having a length, a height, and a width, said length being substantially greater than said height or width;

each of said second plurality of guide elements being connected to and being disposed to project from a corresponding one of said third plurality of projections over and across said width of said conveyor with its length substantially transverse to said length of said conveyor, and over and across said first and second guides;

each of said second plurality of guide elements being configured and disposed to be moved by said second conveyor chain to contact and compact containers into groups on said conveyor;

at least one of said third and fourth guide structures is movable up and down with respect to the other of said third and fourth guide structures to move its corresponding one of said third and fourth pluralities of projections up and down with respect to the other of said third and fourth pluralities of projections to thus shorten or lengthen said second conveyor chain to thus shorten or lengthen the space between successive guide rods to thus permit grouping of containers into groups having at least one of: different numbers of containers, different outer perimeter shapes, and different outer perimeter sizes and dimensional;

each of said first plurality of guide elements being disposed between a pair of said second plurality of guide elements, and each of said second plurality of guide elements being disposed between a pair of said first plurality of guide elements, to thus form compacting pairs of guide elements comprising one of said first plurality of guide elements and one of said second plurality of guide elements; and said guide elements of each compacting pair of guide elements being configured to be disposed one on each side of a group of containers to thus clamp or compact a group of containers between each compacting pair of guide elements.

9. The container handling machine according to claim 8, wherein:

each of said guide elements is mounted co-axially on its corresponding projection;

each of said guide structures comprises a grooved cam track; and at least one of said motors is configured to drive its conveyor chain at a speed greater than the speed of movement of said conveyor to thus move each of said guide elements on its conveyor chain at a speed greater than the speed of movement of said conveyor to approach and contact a group of containers ahead of said guide element on said conveyor belt to push and further separate the group of containers from a subsequent group of containers and to compact the group of containers.

10. The container handling machine according to claim 9, wherein:

the spacing of successive guide elements is adjustable by one of: an automatic control computer or manually input of a desired container group formation into the control computer; and said container handling machine comprises at least one chain take-up to compensate for the lengthening and shortening of said conveyor chains.

11. A bottle handling machine for maintaining separation and also spacing of groups of bottles and for compacting bottles into groups having a desired outer perimeter shape and outer perimeter size and dimensions, said bottle handling machine comprising:

a conveyor belt being configured and disposed to convey bottles thereon through said bottle handling machine along a direction of movement of said conveyor belt;

said conveyor belt having a length and a width, said length being substantially greater than said width;

said length of said conveyor belt being disposed substantially parallel to the direction of movement of said conveyor belt;

a first guide and a second guide;

said first guide being disposed adjacent said conveyor belt, and being disposed between said conveyor belt and said second guide;

a conveyor chain being configured and disposed to circulate adjacent to said conveyor belt, a portion of which conveyor chain is configured and disposed to move in the same direction of movement as a portion of said conveyor belt that conveys bottles thereon;

a motor being connected to said conveyor chain to drive said conveyor chain;

said conveyor chain comprising a plurality of links joined to each other end-to-end by connectors disposed at the ends of said links;

each of said connectors being configured to permit pivoting rotation of its two joined links with respect to one another;

said connectors comprising a first plurality of pins and a second plurality of pins being disposed to project from said connectors;

each of said first plurality of pins and said second plurality of pins having a length, a height, and a width, said length being greater than said height or width;

each of said first plurality of pins being disposed between a pair of said second plurality of pins, and each of said second plurality of pins being disposed between a pair of said first plurality of pins;

said first guide comprising an elongated guide surface having a length and a width, said length being substantially greater than said width and being disposed substantially parallel to said length of said conveyor belt;

said first plurality of pins being configured and disposed to project across said guide surface of said first guide with their length disposed transverse to said length of said guide surface of said first guide;

said first plurality of pins being configured and disposed to be guided by and to be slid on said guide surface of said first guide along said length of said guide surface of said first guide;

said second guide comprising an upper guide surface and a lower guide surface being disposed opposite and to face one another to define a guide slot there between;

each of said upper and lower guide surfaces having a length and a width, said length being substantially greater than said width, and being disposed substantially parallel to said length of said conveyor belt;

said second plurality of pins being configured and disposed to project between and across said upper and lower guide surfaces of said second guide with their length disposed transverse to said length of said upper and lower guide surfaces of said second guide;

said second plurality of pins being configured and disposed to be guided by said upper and lower guide surfaces of said second guide and to be slid along said length of said upper and lower guide surfaces of said second guide;

a plurality of elongated guide elements having a length, a height, and a width, said length being substantially greater than said height or width;

each of said guide elements being connected to and being disposed to project from a corresponding one of said first plurality of pins over and across said width of said conveyor belt with its length substantially transverse to said length of said conveyor belt;

each of said guide elements being configured and disposed to be moved by said conveyor chain to contact and compact bottles into groups on said conveyor belt; and said guide surface of said first guide is movable up and down with respect to said guide surfaces of said second guide to move said first plurality of pins up and down with respect to said second plurality of pins being retained in between said guide surfaces of said second guide to thus shorten or lengthen said conveyor chain to thus shorten or lengthen the space between successive guide elements to thus permit grouping of bottles into groups having at least one of: different numbers of bottles, different outer perimeter shapes, and different outer perimeter sizes and dimensions.

12. The bottle handling machine according to claim 11, wherein:

each of said guide elements is mounted co-axially on its corresponding pin;

each of said guide surfaces comprises a grooved cam track;

said motor is configured to drive said conveyor chain at a speed greater than the speed of movement of said conveyor belt to thus move each of said guide elements at a speed greater than the speed of movement of said conveyor belt to approach and contact a group of bottles ahead of said guide element on said conveyor belt to push and further separate the group of bottles from a subsequent group of bottles and to compact the group of bottles;

said guide surface of said first guide comprises a first end and a second end disposed opposite one another;

said first end and said second end of said guide surface of said first guide are individually movable up and down to permit tilting of said guide surface;

said guide surfaces of said second guide are also movable up and down with respect to said first guide surface;

the spacing of successive guide elements is adjustable by one of: an automatic control computer or manually input of a desired bottle group formation into the control computer; and said bottle handling machine comprises a chain take-up to compensate for the lengthening and shortening of said conveyor chain.

13. The bottle handling machine according to claim 11, wherein said bottle handling machine further comprises:

a third guide and a fourth guide, wherein said pair of first and second guides and said pair of third and fourth guides are disposed on opposite sides of said conveyor belt disposed between said pairs of guides;

said third guide being disposed adjacent said conveyor belt, and being disposed between said conveyor belt and said fourth guide;

said conveyor chain comprises a first conveyor chain;

a second conveyor chain being configured and disposed to circulate adjacent to said conveyor belt on an opposite side of said conveyor belt from said first conveyor chain, a portion of which said second conveyor chain is configured and disposed to move in the same direction of movement as a portion of said conveyor belt that conveys bottles thereon;

a second motor being connected to said second conveyor chain to drive said second conveyor chain;

said second conveyor chain comprising a plurality of links joined to each other end-to-end by connectors disposed at the ends of said links;

each of said connectors of said second conveyor chain being configured to permit pivoting rotation of its two joined links with respect to one another;

said connectors of said second conveyor chain comprising a third plurality of pins and a fourth plurality of pins being disposed to project from said connectors of said second conveyor chain;

each of said third plurality of pins and said fourth plurality of pins having a length, a height, and a width, said length being greater than said height or width;

each of said third plurality of pins being disposed between a pair of said fourth plurality of pins, and each of said fourth plurality of pins being disposed between a pair of said third plurality of pins;

said third guide comprising an elongated guide surface having a length and a width, said length being substantially greater than said width and being disposed substantially parallel to said length of said conveyor belt;

said third plurality of pins being configured and disposed to project across said guide surface of said third guide with their length disposed transverse to said length of said guide surface of said third guide;

said third plurality of pins being configured and disposed to be guided by and to be slid on said guide surface of said third guide along said length of said guide surface of said third guide;

said fourth guide comprising an upper guide surface and a lower guide surface being disposed opposite and to face one another to define a guide slot there between;

each of said upper and lower guide surfaces of said fourth guide having a length and a width, said length being substantially greater than said width, and being disposed substantially parallel to said length of said conveyor belt;

said fourth plurality of pins being configured and disposed to project between and across said upper and lower guide surfaces of said fourth guide with their length disposed transverse to said length of said upper and lower guide surfaces of said fourth guide;

said fourth plurality of pins being configured and disposed to be guided by said upper and lower guide surfaces of said fourth guide and to be slid along said length of said upper and lower guide surfaces of said fourth guide;

each of said guide elements comprising a guide bar;

each of said guide bars also being connected to and being disposed to project from a corresponding one of said third plurality of pins over and across said width of said conveyor belt with its length substantially transverse to said length of said conveyor belt, such that each of said guide bars is connected on one end with a pin of said first plurality of pins and on an opposite end with a pin of said third plurality of pins;

each of said guide rods being configured and disposed to be moved by said first and second conveyor chains to contact and compact bottles into groups on said conveyor belt; and said guide surface of said third guide is movable up and down with respect to said guide surfaces of said fourth guide, and essentially simultaneously with said first guide, to move said third plurality of pins up and down with respect to said fourth plurality of pins being retained in between said guide surfaces of said fourth guide to thus shorten or lengthen said second conveyor chain to thus shorten or lengthen the space between successive guide rods to thus permit grouping of bottles into groups having at least one of: different numbers of bottles, different outer perimeter shapes, and different outer perimeter sizes and dimensions.

14. The bottle handling machine according to claim 13, wherein:

each of said guide rods is mounted co-axially on its corresponding pin;

each of said guide surfaces comprises a grooved cam track;

said motors are configured to drive said conveyor chains at a speed greater than the speed of movement of said conveyor belt to thus move each of said guide rods at a speed greater than the speed of movement of said conveyor belt to approach and contact a group of bottles ahead of said guide rod on said conveyor belt to push and further separate the group of bottles from a subsequent group of bottles and to compact the group of bottles;

said guide surface of each of said first guide and said third guide comprises a first end and a second end disposed opposite one another;

said first end and said second end of said guide surface of each of said first guide and said third guide are individually movable up and down to permit tilting of said guide surface;

the spacing of successive guide rods is adjustable by one of: an automatic control computer or manually input of a desired bottle group formation into the control computer; and said bottle handling machine comprises at least one chain take-up to compensate for the lengthening and shortening of said conveyor chains.

15. The bottle handling machine according to claim 11, wherein said bottle handling machine further comprises:

a third guide and a fourth guide disposed adjacent said pair of first and second guides, wherein said pair of first and second guides is disposed between said pair of third and fourth guides and said conveyor belt;

said third guide being disposed between said second guide and said fourth guide;

said conveyor chain comprises a first conveyor chain;

a second conveyor chain being configured and disposed to circulate in the same direction as said first conveyor chain;

a second motor being connected to said second conveyor chain to drive said second conveyor chain;

said second conveyor chain comprising a plurality of links joined to each other end-to-end by connectors disposed at the ends of said links;

each of said connectors of said second conveyor chain being configured to permit pivoting rotation of its two joined links with respect to one another to define an acute angle between the two joined links;

said connectors of said second conveyor chain comprising a third plurality of pins and a fourth plurality of pins being disposed to project from said connectors of said second conveyor chain;

each of said third plurality of pins and said fourth plurality of pins having a length, a height, and a width, said length being greater than said height or width;

each of said third plurality of pins being disposed between a pair of said fourth plurality of pins, and each of said fourth plurality of pins being disposed between a pair of said third plurality of pins;

said third guide comprising an elongated guide surface having a length and a width, said length being substantially greater than said width and being disposed substantially parallel to said length of said conveyor belt;

said third plurality of pins being configured and disposed to project across said guide surface of said third guide with their length disposed transverse to said length of said guide surface of said third guide;

said third plurality of pins being configured and disposed to be guided by and to be slid on said guide surface of said third guide along said length of said guide surface of said third guide;

said fourth guide comprising an upper guide surface and a lower guide surface being disposed opposite and to face one another to define a guide slot there between;

each of said upper and lower guide surfaces of said fourth guide having a length and a width, said length being substantially greater than said width, and being disposed substantially parallel to said length of said conveyor belt;

said fourth plurality of pins being configured and disposed to project between and across said upper and lower guide surfaces of said fourth guide with their length disposed transverse to said length of said upper and lower guide surfaces of said fourth guide;

said fourth plurality of pins being configured and disposed to be guided by said upper and lower guide surfaces of said fourth guide and to be slid along said length of said upper and lower guide surfaces of said fourth guide;

said plurality of elongated guide elements comprises a first plurality of elongated guide elements;

a second plurality of elongated guide elements having a length, a height, and a width, said length being substantially greater than said height or width;

each of said second plurality of guide elements being connected to and being disposed to project from a corresponding one of said third plurality of pins over and across said width of said conveyor belt with its length substantially transverse to said length of said conveyor belt, and over and across said first and second guides;

each of said second plurality of guide elements being configured and disposed to be moved by said second conveyor chain to contact and compact bottles into groups on said conveyor belt;

said guide surface of said third guide is movable up and down with respect to said guide surfaces of said fourth guide to move said third plurality of pins up and down with respect to said fourth plurality of pins being retained in between said guide surfaces of said fourth guide to thus shorten or lengthen said second conveyor chain to thus shorten or lengthen the space between successive guide elements of said second plurality of guide elements to thus permit grouping of bottles into groups having at least one of: different numbers of bottles, different outer perimeter shapes, and different outer perimeter sizes and dimensions;

each of said first plurality of guide elements being disposed between a pair of said second plurality of guide elements, and each of said second plurality of guide elements being disposed between a pair of said first plurality of guide elements, to thus form compacting pairs of guide elements comprising one of said first plurality of guide elements and one of said second plurality of guide elements; and said guide elements of each compacting pair of guide elements being configured to be disposed one on each side of a group of bottles to thus clamp or compact a group of bottles between each compacting pair of guide elements.

16. The bottle handling machine according to claim 15, wherein:

each of said guide elements is mounted co-axially on its corresponding pin;

each of said guide surfaces comprises a grooved cam track;

at least one of said motors is configured to drive its conveyor chain at a speed greater than the speed of movement of said conveyor belt to thus move each of said guide elements on its conveyor chain at a speed greater than the speed of movement of said conveyor belt to approach and contact a group of bottles ahead of said guide element on said conveyor belt to push and further separate the group of bottles from a subsequent group of bottles and to compact the group of bottles;

the spacing of successive guide elements is adjustable by one of: an automatic control computer or manually input of a desired bottle group formation into the control computer; and said bottle handling machine comprises at least one chain take-up to compensate for the lengthening and shortening of said conveyor chains.

17. A beverage bottling plant for filling beverage bottles with liquid beverage material, said beverage bottling plant comprising:

a plurality of rotary machines comprising at least a rotary beverage bottle filling machine and a rotary beverage bottle closing machine;

a first conveyor arrangement being configured and disposed to convey beverage bottles to be filled to said beverage bottle filling machine;

said beverage bottle filling machine being configured and disposed to fill beverage bottles with liquid beverage material;

said beverage bottle filling machine comprising:
a rotor;
a rotatable vertical machine column;
said rotor being connected to said vertical machine column to permit rotation of said rotor about said vertical machine column;
a plurality of beverage bottle filling elements for filling beverage bottles with liquid beverage material being disposed on the periphery of said rotor;
each of said plurality of beverage bottle filling elements comprising a container carrier being configured and disposed to receive and hold beverage bottles to be filled;
each of said plurality of beverage bottle filling elements being configured and disposed to dispense liquid beverage material into beverage bottles to be filled;
at least one liquid reservoir being configured to hold a supply of liquid beverage material; and
at least one supply line being configured and disposed to connect said at least one liquid reservoir to said beverage bottle filling machine to supply liquid beverage material to said beverage bottle filling machine;

a second conveyor arrangement being configured and disposed to convey filled beverage bottles from said beverage bottle filling machine to said beverage bottle closing machine;

said beverage bottle closing machine being configured and disposed to close tops of filled beverage bottles;

said beverage bottle closing machine comprising:
a rotor;
a rotatable vertical machine column;
said rotor being connected to said vertical machine column to permit rotation of said rotor about said vertical machine column;
a plurality of closing devices being disposed on the periphery of said rotor;
each of said plurality of closing devices being configured and disposed to place closures on filled beverage bottles; and
each of said plurality of closing devices comprising a container carrier being configured and disposed to receive and hold filled beverage bottles;

a beverage bottle packaging machine being configured and disposed to separate a number of bottles into groups and package the groups of bottles;

a third conveyor arrangement being configured and disposed to convey filled, closed beverage bottles from said beverage bottle closing machine to said beverage bottle packaging machine;

said beverage bottle packaging machine comprising a beverage bottle handling machine for maintaining separation and also spacing of groups of bottles and for compacting bottles into groups having a desired outer perimeter shape and outer perimeter size and dimensions; and said beverage bottle handling machine comprising:
a conveyor belt being configured and disposed to convey beverage bottles thereon through said beverage bottle handling machine along a direction of movement of said conveyor belt;
said conveyor belt having a length and a width, said length being substantially greater than said width;
said length of said conveyor belt being disposed substantially parallel to the direction of movement of said conveyor belt;
a first guide and a second guide;
said first guide being disposed adjacent said conveyor belt, and being disposed between said conveyor belt and said second guide;
a conveyor chain being configured and disposed to circulate adjacent to said conveyor belt, a portion of which conveyor chain is configured and disposed to move in the same direction of movement as a portion of said conveyor belt that conveys beverage bottles thereon;

a motor being connected to said conveyor chain to drive said conveyor chain;

said conveyor chain comprising a plurality of links joined to each other end-to-end by connectors disposed at the ends of said links;

each of said connectors being configured to permit pivoting rotation of its two joined links with respect to one another to define an acute angle between the two joined links;

said connectors comprising a first plurality of pins and a second plurality of pins being disposed to project from said connectors;

each of said first plurality of pins and said second plurality of pins having a length, a height, and a width, said length being greater than said height or width;

each of said first plurality of pins being disposed between a pair of said second plurality of pins, and each of said second plurality of pins being disposed between a pair of said first plurality of pins;

said first guide comprising an elongated guide surface having a length and a width, said length being substantially greater than said width and being disposed substantially parallel to said length of said conveyor belt;

said first plurality of pins being configured and disposed to project across said guide surface of said first guide with their length disposed transverse to said length of said guide surface of said first guide;

said first plurality of pins being configured and disposed to be guided by and to be slid on said guide surface of said first guide along said length of said guide surface of said first guide;

said second guide comprising an upper guide surface and a lower guide surface being disposed opposite and to face one another to define a guide slot there between;

each of said upper and lower guide surfaces having a length and a width, said length being substantially greater than said width, and being disposed substantially parallel to said length of said conveyor belt;

said second plurality of pins being configured and disposed to project between and across said upper and lower guide surfaces of said second guide with their length disposed transverse to said length of said upper and lower guide surfaces of said second guide;

said second plurality of pins being configured and disposed to be guided by said upper and lower guide surfaces of said second guide and to be slid along said length of said upper and lower guide surfaces of said second guide;

a plurality of elongated guide elements having a length, a height, and a width, said length being substantially greater than said height or width;

each of said guide elements being connected to and being disposed to project from a corresponding one of said first plurality of pins over and across said width of said conveyor belt with its length substantially transverse to said length of said conveyor belt;

each of said guide elements being configured and disposed to be moved by said conveyor chain to contact and compact beverage bottles into groups on said conveyor belt; and said guide surface of said first guide is movable up and down with respect to said guide surfaces of said second guide to move said first plurality of pins up and down with respect to said second plurality of pins being retained in between said guide surfaces of said second guide to thus shorten or lengthen said conveyor chain to thus shorten or lengthen the space between successive guide elements to thus permit grouping of beverage bottles into groups having at least one of: different numbers of beverage bottles, different outer perimeter shapes, and different outer perimeter sizes and dimensions.

18. The beverage bottling plant according to claim 17, wherein:

each of said guide elements is mounted co-axially on its corresponding pin;

each of said guide surfaces comprises a grooved cam track;

said motor is configured to drive said conveyor chain at a speed greater than the speed of movement of said conveyor belt to thus move each of said guide elements at a speed greater than the speed of movement of said conveyor belt to approach and contact a group of beverage bottles ahead of said guide element on said conveyor belt to push and further separate the group of beverage bottles from a subsequent group of beverage bottles and to compact the group of beverage bottles;

said guide surface of said first guide comprises a first end and a second end disposed opposite one another;

said first end and said second end of said guide surface of said first guide are individually movable up and down to permit tilting of said guide surface;

said guide surfaces of said second guide are also movable up and down with respect to said first guide surface;

the spacing of successive guide elements is adjustable by one of: an automatic control computer or manually input of a desired beverage bottle group formation into the control computer; and said bottle handling machine comprises a chain take-up to compensate for the lengthening and shortening of said conveyor chain.

19. The beverage bottling plant according to claim 17, wherein said bottle handling machine further comprises:

a third guide and a fourth guide, wherein said pair of first and second guides and said pair of third and fourth guides are disposed on opposite sides of said conveyor belt disposed between said pairs of guides;

said third guide being disposed adjacent said conveyor belt, and being disposed between said conveyor belt and said fourth guide;

said conveyor chain comprises a first conveyor chain;

a second conveyor chain being configured and disposed to circulate adjacent to said conveyor belt on an opposite side of said conveyor belt from said first conveyor chain, a portion of which said second conveyor chain is configured and disposed to move in the same direction of movement as a portion of said conveyor belt that conveys beverage bottles thereon;

a second motor being connected to said second conveyor chain to drive said second conveyor chain;

said second conveyor chain comprising a plurality of links joined to each other end-to-end by connectors disposed at the ends of said links;

each of said connectors of said second conveyor chain being configured to permit pivoting rotation of its two joined links with respect to one another to define an acute angle between the two joined links;

said connectors of said second conveyor chain comprising a third plurality of pins and a fourth plurality of pins being disposed to project from said connectors of said second conveyor chain;

each of said third plurality of pins and said fourth plurality of pins having a length, a height, and a width, said length being greater than said height or width;

each of said third plurality of pins being disposed between a pair of said fourth plurality of pins, and each of said fourth plurality of pins being disposed between a pair of said third plurality of pins; of said upper and lower guide surfaces of said fourth guide;

said fourth plurality of pins being configured and disposed to be guided by said upper and lower guide surfaces of said fourth guide and to be slid along said length of said upper and lower guide surfaces of said fourth guide;

each of said guide elements comprising a guide bar;

each of said guide bars also being connected to and being disposed to project from a corresponding one of said third plurality of pins over and across said width of said conveyor belt with its length substantially transverse to said length of said conveyor belt, such that each of said guide bars is connected on one end with a pin of said first plurality of pins and on an opposite end with a pin of said third plurality of pins;

each of said guide rods being configured and disposed to be moved by said first and second conveyor chains to contact and compact beverage bottles into groups on said conveyor belt; and said guide surface of said third guide is movable up and down with respect to said guide surfaces of said fourth guide, and essentially simultaneously with said first guide, to move said third plurality of pins up and down with respect to said fourth plurality of pins being retained in between said guide surfaces of said fourth guide to thus shorten or lengthen said second conveyor chain to thus shorten or lengthen the space between successive guide rods to thus permit grouping of beverage bottles into groups having at least one of: different numbers of beverage bottles, different outer perimeter shapes, and different outer perimeter sizes and dimensions.

20. The beverage bottling plant according to claim 17, wherein said bottle handling machine further comprises:

a third guide and a fourth guide disposed adjacent said pair of first and second guides, wherein said pair of first and second guides is disposed between said pair of third and fourth guides and said conveyor belt;

said third guide being disposed between said second guide and said fourth guide;

said conveyor chain comprises a first conveyor chain;

a second conveyor chain being configured and disposed to circulate in the same direction as said first conveyor chain;

a second motor being connected to said second conveyor chain to drive said second conveyor chain;

said second conveyor chain comprising a plurality of links joined to each other end-to-end by connectors disposed at the ends of said links;

each of said connectors of said second conveyor chain being configured to permit pivoting rotation of its two joined links with respect to one another to define an acute angle between the two joined links;

said connectors of said second conveyor chain comprising a third plurality of pins and a fourth plurality of pins being disposed to project from said connectors of said second conveyor chain;

each of said third plurality of pins and said fourth plurality of pins having a length, a height, and a width, said length being greater than said height or width;

each of said third plurality of pins being disposed between a pair of said fourth plurality of pins, and each of said fourth plurality of pins being disposed between a pair of said third plurality of pins;

said third guide comprising an elongated guide surface having a length and a width, said length being substantially greater than said width and being disposed substantially parallel to said length of said conveyor belt;

said third plurality of pins being configured and disposed to project across said guide surface of said third guide with their length disposed transverse to said length of said guide surface of said third guide;

said third plurality of pins being configured and disposed to be guided by and to be slid on said guide surface of said third guide along said length of said guide surface of said third guide;

said fourth guide comprising an upper guide surface and a lower guide surface being disposed opposite and to face one another to define a guide slot there between;

each of said upper and lower guide surfaces of said fourth guide having a length and a width, said length being substantially greater than said width, and being disposed substantially parallel to said length of said conveyor belt;

said fourth plurality of pins being configured and disposed to project between and across said upper and lower guide surfaces of said fourth guide with their length disposed transverse to said length of said upper and lower guide surfaces of said fourth guide;

said fourth plurality of pins being configured and disposed to be guided by said upper and lower guide surfaces of said fourth guide and to be slid along said length of said upper and lower guide surfaces of said fourth guide;

said plurality of elongated guide elements comprises a first plurality of elongated guide elements;

a second plurality of elongated guide elements having a length, a height, and a width, said length being substantially greater than said height or width;

each of said second plurality of guide elements being connected to and being disposed to project from a corresponding one of said third plurality of pins over and across said width of said conveyor belt with its length substantially transverse to said length of said conveyor belt, and over and across said first and second guides;

each of said second plurality of guide elements being configured and disposed to be moved by said second conveyor chain to contact and compact beverage bottles into groups on said conveyor belt;

said guide surface of said third guide is movable up and down with respect to said guide surfaces of said fourth guide to move said third plurality of pins up and down with respect to said fourth plurality of pins being retained in between said guide surfaces of said fourth guide to thus shorten or lengthen said second conveyor chain to thus shorten or lengthen the space between successive guide elements of said second plurality of guide elements to thus permit grouping of beverage bottles into groups having at least one of: different numbers of beverage bottles, different outer perimeter shapes, and different outer perimeter sizes and dimensions;

each of said first plurality of guide elements being disposed between a pair of said second plurality of guide elements, and each of said second plurality of guide elements being disposed between a pair of said first plurality of guide elements, to thus form compacting pairs of guide elements comprising one of said first plurality of guide elements and one of said second plurality of guide elements; and said guide elements of each compacting pair of guide elements being configured to be disposed one on each side of a group of beverage bottles to thus clamp or compact a group of bottles between each compacting pair of guide elements.

\* \* \* \* \*